United States Patent [19]

Bigo

[11] Patent Number: 5,176,511
[45] Date of Patent: Jan. 5, 1993

[54] SEAL STRUCTURE FOR A ROTATING CAM PRESSURIZED FLUID DEVICE

[75] Inventor: Louis B. Bigo, Compiegne, France

[73] Assignee: Poclain Hydraulics, Verberie, France

[21] Appl. No.: 795,040

[22] Filed: Nov. 20, 1991

[30] Foreign Application Priority Data

Nov. 23, 1990 [FR] France ............... 90 14660

[51] Int. Cl.⁵ ............... F01B 1/06; F03C 1/24
[52] U.S. Cl. ............... 418/104; 91/498; 417/462
[58] Field of Search ............ 91/491, 498; 417/273, 417/462; 418/104

[56] References Cited

U.S. PATENT DOCUMENTS

| 444,901 | 1/1891 | Abbe ............... 91/491 |
| 4,440,067 | 4/1984 | Klie et al. ............... 91/491 |
| 4,898,076 | 2/1990 | Bigo et al. ............... 91/491 |
| 5,090,295 | 2/1992 | Cunningham ............... 91/491 |

FOREIGN PATENT DOCUMENTS

| 1929079 | 12/1970 | Fed. Rep. of Germany . |
| 2524676 | 12/1976 | Fed. Rep. of Germany . |
| 3642721 | 6/1988 | Fed. Rep. of Germany . |
| 1214899 | 4/1960 | France . |
| 2160118 | 6/1973 | France . |
| 2292854 | 6/1976 | France . |
| 2473619 | 7/1981 | France . |
| 55-153871 | 12/1980 | Japan ............... 91/491 |

Primary Examiner—Richard A. Bertsch
Assistant Examiner—Laleh Jalali

[57] ABSTRACT

A mechanism is disclosed, comprising: a cylinder-block; a cam; an internal fluid distributor slide valve presenting a recess whose shape is complementary of a central core; grooves made between internal distributor valve and central core; and seal elements disposed on either side of each groove. According to the invention, each seal element comprises a ring-type joint made of a plastics material, the maximum value of the pressures in the grooves being equal to 450 bars and that of the speed of rotation of the internal fluid distributor valve with respect to the central core, being equal to 200 rpm. One application of the invention is the production of a motor having a satisfactory volumetric efficiency.

6 Claims, 2 Drawing Sheets

SEAL STRUCTURE FOR A ROTATING CAM PRESSURIZED FLUID DEVICE

FIELD OF THE INVENTION

The present invention relates to a so-called "rotating cam" type pressurized fluid mechanism.

BACKGROUND OF THE INVENTION

A so-called "rotating cam" type pressurized fluid mechanism, motor or pump, is already known, which comprises: a cylinder-block fixed with respect to an outer support of the mechanism; a cam mounted to rotate with respect to said cylinder-block about an axis of rotation; an internal fluid distributor slide valve, fast with respect to the rotation of said cam, presenting a central recess whose shape is complementary of that of a central core fast with respect to the rotation of said cylinder-block; grooves made between said internal fluid distributing valve and central core, constituting enclosures capable of containing fluids under pressure; and seal elements disposed between the internal fluid distributor valve and the central core, on either side of each groove, each contained in a housing made in a first of the two pieces—internal distributor valve and central core.

In conventional manner, the seal elements are constituted by metal segments, which are known for their aptitude to provide a satisfactory seal between two pieces in relative displacement, particularly between two pieces mounted for relative rotation, such as said internal distributor valve with respect to the central core. Moreover, the segments used heretofore are of relatively low fragility. However, a certain skill is required for employing them, such use being well mastered at the present time; moreover, their dimensions are relatively large, all the more so as each seal element is frequently constituted by two segments placed in two adjacent housings, this in order to obtain the seal which one segment alone would not enable, taking into account the presence of a cut allowing assembly of the segment and its low deformability.

The invention proposes a new choice of the seal elements, by which, with a smaller space requirement, the seal obtained is better than that obtained heretofore by using metal segments.

SUMMARY OF THE INVENTION

According to the invention, each seal element comprises a ring-type joint which is made of a plastics material and is in tight contact with the second of the said two pieces, the maximum value of the pressures in said grooves being equal to 450 bars and that of the speed of rotation of the cam with respect to the cylinder-block (therefore of the internal fluid distributor valve with respect to the central core) being equal to 200 rpm.

The following advantageous arrangements are, furthermore, preferably adopted:

between the bottom of the housing of a ring-type joint and said ring-type joint, a spring is interposed and has an effect tending to deform the joint in the sense of its application on the opposite face of the second of the said two pieces;

the spring is constituted by an O-ring made of elastomer;

the spring is constituted by a cut, elastically deformable metal ring;

the housings of the seal elements are made in the central core.

The principal advantage of the arrangement proposed according to the invention resides in the reduction of the axial space requirement of the seal elements, the seal obtained being better than before.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
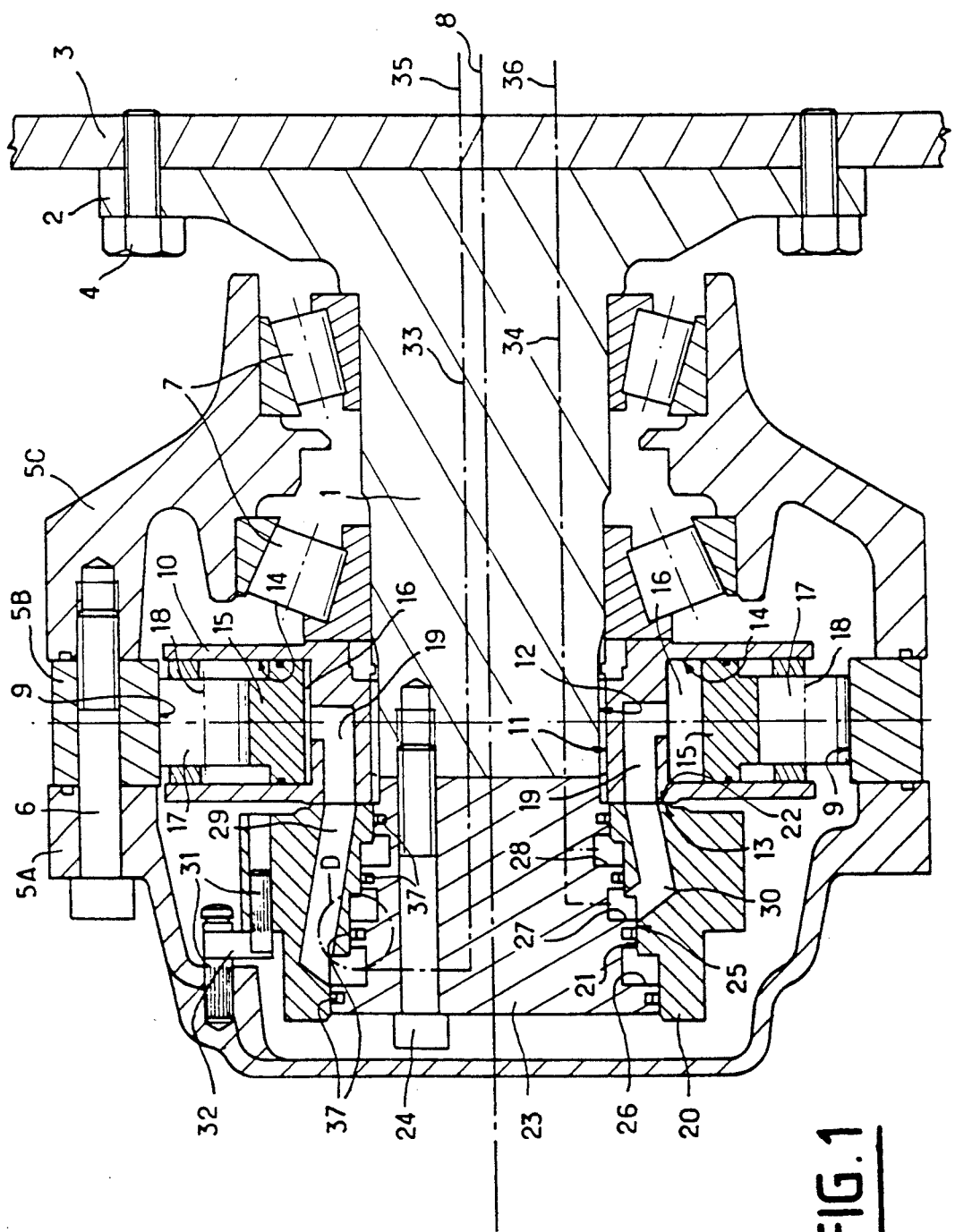
FIG. 1 is an axial section through a hydraulic motor according to the invention.

Referring now to the drawings, the motor shown in FIG. 1 presents a shaft 1, of which one end is shaped into a flange 2 which allows said motor to be fixed on a support 3, outside the motor, by means of screws 4. Support 3 is for example constituted by the chassis of a vehicle.

This motor comprises:

a housing in three parts 5A, 5B, 5C, which are assembled by screws 6;

conical bearings 7 which effect rotational assembly of housing 5A-5B-5C with respect to shaft 1, about an axis of rotation 8, bearings 7 being disposed between part 5C of the housing and shaft 1;

a lobed cam 9 which is constituted by the inner peripheral face of part 5B of the housing;

a cylinder-block 10 which comprises a central recess provided with splines 11, these splines 11 cooperating with splines 12 with which shaft 1 is provided, in order to effect assembly of cylinder-block 10 on shaft 1 and to render these two pieces fast with respect to rotation about the axis of rotation 8;

a communication face 13, belonging to the cylinder-block 10, perpendicular to the axis of rotation 8;

a plurality of cylinders 14, made in the cylinder-block 10, disposed radially with respect to the axis of rotation 8 and regularly spaced apart angularly;

a plurality of pistons 15, each mounted to slide in a cylinder 14 and defining inside said cylinder a work chamber 16 for the hydraulic fluid;

a plurality of cylinders 17, each mounted at the end of a piston 15 so as to be able to rotate about an axis 18 parallel to the axis of rotation 8 and to effect abutment of each piston 15 on the cam 9;

cylinder ducts 19, one per cylinder, which connect the work chambers 16 to the communication face 13, opening therein via ports centred on the same circle, itself coaxial to the axis of rotation 8, and being regularly distributed angularly;

an internal fluid distributor slide valve 20 which comprises a central recess 21 and a plane distribution face 22 maintained in abutment on the communication face 13 of the cylinder-block;

a central core 23 which is fixed on the inner end of the shaft 1 by means of screws 24, and which presents an axial face 25, whose shape is complementary of that of the central recess 21 of the internal slide valve 20;

three grooves 26, 27, 28 made between said central recess 21 and axial face 25, in the example shown, made in the central core 23;

ducts 29, 30 made in the internal slide valve 20, which connect the grooves 26, 27 respectively to the distribution face 22, opening out therein via ports centred on a circle coaxial to the axis of rotation 8 and of diameter equal to that of centering of the ports of the cylinder ducts 19 in the communication face 13;

two lugs 31, fixed in part 5A of the housing and in the internal slide valve 20, connected by a lever 32, the assembly effecting immobilization, vis-á-vis rotation of the internal slide valve 20 with respect to the cam 9, via housing 5A-5B-5C;

two inner ducts 33, 34, made in the central core 23 and in shaft 1 and connecting the grooves 26, 27 to two outer ducts 35, 36, respectively, for supply of the motor with fluid under pressure and for exhaust towards a discharge reservoir of the fluid having worked in the motor;

ring-type joints 37 are disposed, one on either side of each groove 26, 27, 28, between the central core 23 and the recess 21 of the internal slide valve 20, and provide seal between these two pieces.

Of course, it is essential that the abutment of the distribution face 22 of the internal slide valve 20 on the communication face 13 of the cylinder-block 10 be effected with seal. To that end, a diametral clearance (J) is made between the axial faces 21 of the internal slide valve and 25 of the central core 23, allowing a slight misalignment of the internal slide valve with respect to the axis of rotation 8. The internal slide valve 20 is mounted "to float", so that its distribution face 22 effectively abuts tightly on the communication face 13 of the cylinder-block 10. The function of the ring-type joints 37, interposed between two pieces,—internal slide valve 20 and central core 23—, mounted to rotate with respect to each other, is to provide dynamic seal between these two pieces, seal which the existence of clearance J does not ensure directly between said pieces. It should be noted that clearance J is small, that the misalignment of the internal slide valve with respect to the axis of rotation also remains slight, and that, consequently, the distribution face 22 is permanently substantially perpendicular to the axis of rotation 8.

Taking into account the fact that the internal slide valve 20 and the central core 23 are mounted for relative rotation, the ring-type joints similar to joints 37 shown, were constituted, before the present invention, by metal segments which constituted the only known means for effecting dynamic seals.

In novel manner according to the invention, particularly in each of the three embodiments according to FIGS. 2A-2B, 3A-3B and 4A-4B, the ring-type joints 37 are made of a plastics material, polyamide 6 (PA 6) and polyamide 6.6 (PA 6.6) preferably being selected by reason of all their characteristics. In the embodiments shown, joints 37 are partially contained in grooves 38 made in the central core 23 and opening out on its periphery.

Figure 2A:
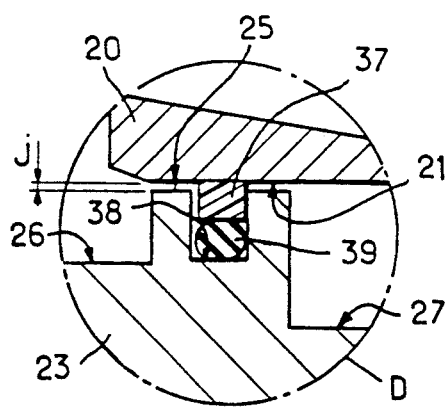
FIG. 2A is an enlargement of detail D of FIG. 1.
Figure 2B:
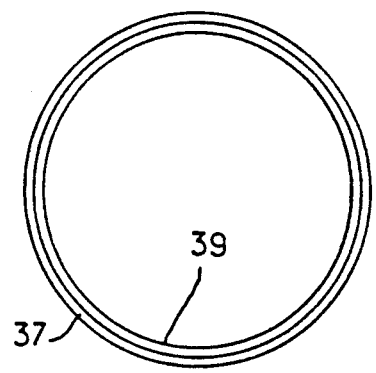
FIG. 2B is a transverse view through one of the seal elements used in the motor of FIG. 1.

According to the embodiment of FIGS. 2A, 2B, an O-ring 39 of elastomer, for example nitrile butadiene, known under the name "NBR", is interposed between the bottom of the groove 38 and the joint 37 and has for its effect to apply joint 37 firmly on the opposite face of the recess 21. O-ring 39 is continuous, without interruption.

Figure 3A:
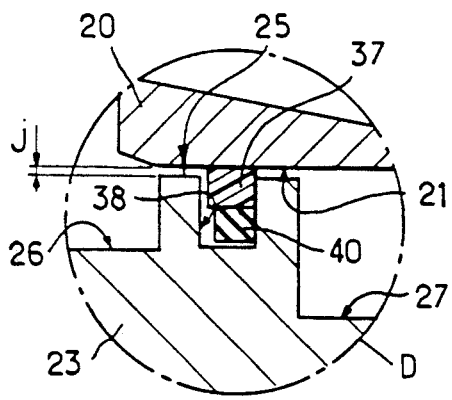
FIGS. 3A, 3B, and 4A, 4B, similar to FIGS. 2A, 2B, respectively, represent two variant embodiments of seal elements according to the invention.
Figure 3B:
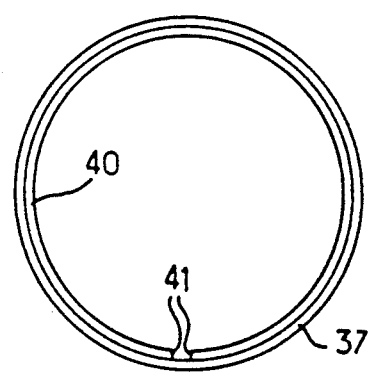

According to the embodiment of FIGS. 3A, 3B, it is an elastic, metal, annular segment 40, which comprises an interruption 41, which is disposed between the bottom of the groove 38 and the joint 37, with the same purpose as O-ring 39 of FIGS. 2A, 2B.

Figure 4A:
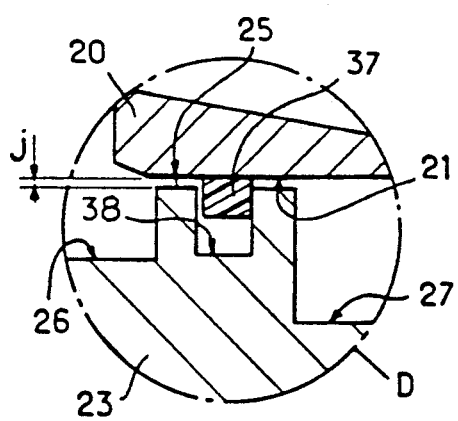
Figure 4B:
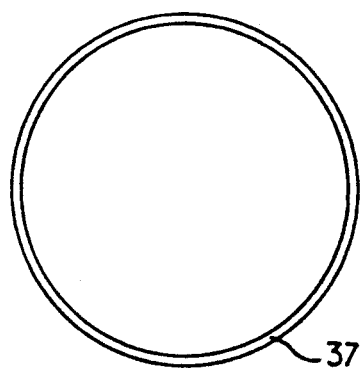

Finally, in the embodiment of FIGS. 4A, 4B, the joint 37 is sufficiently resistant and elastic to provide by itself the seal in contact with the opposite face of recess 21.

The function of seal between two pieces rotating with respect to each other, performed by joint 37, is not new. This seal was heretofore provided, as has already been recalled, by metal segments. What is novel is the fact of effecting this seal between two rotating elements by means of a joint made of a plastics material. Tests effected with the plastics materials selected (polyamide 6 and 6.6) for making the joints 37 show that such joints deform under the effect of the pressures of the fluids, but resist these pressures and the stresses provoked by the speed of rotation.

Prior to the invention, it had been estimated that plastics materials were unsuitable to be used for constituting joints between two pieces mounted for relative rotation. It was considered that such joints would be too fragile. The invention has consisted in overcoming this technological prejudice and, by recommending joints made of plastics material, has shown that such novel joints, by their capacity to be deformed under the effect of the pressure of a fluid, were more efficient and ensured a better seal than metal segments, even with smaller dimensions. The volumetric efficiency of the mechanism was thus able to be increased. Implementation of the invention has also shown the good operating performance of joints 37 made of a plastics material.

Moreover, the following were noted:

an increase in the mechanical efficiency of the motor, the forces of friction between joints 37 and the recess 21 being equal only to half those observed heretofore between metal segments and said recess;

the reduction of the friction at all speeds of rotation, in particular at virtually zero speed of rotation, makes it possible to reduce the dimensions of the drive pieces, such as lugs 31 and lever 32;

a reduction in the length of the assembly bevels of joints 37 with respect to the length of the assembly bevels of the metal segments, this being in relation with the fact that the segment, open by nature, mounted in its groove 38 on the piece 23, has a diameter before assembly in piece 20 which is greater than the diameter of the plastic joint 37 under the same conditions, such reduction in length contributing to improving the axial compactness of the corresponding motor.

Finally, it should be noted that the invention is also applicable to the production of pumps having a rotating cam, fluid supply and exhaust being effected by the axial part of the mechanism.

By way of complementary indications, the application of the invention in the production of motors and pumps having the following characteristics was proved to be particularly satisfactory:

diameters up to 200 mm;

pressures in grooves 26, 27, 28, up to 450 bars;

speed of rotation of housing 5A-5B-5C with respect to the cylinder-block 10 and therefore of the internal slide valve 20 with respect to the central core 23, up to 200 rpm;

clearances J up to 0.40 mm.

The invention is not limited to the embodiments described, but covers, on the contrary, all the variants which may be made thereto without departing from its scope nor its spirit.

What is claimed is:

1. In a rotating cam type pressurized fluid mechanism, motor or pump, comprising:
   a cylinder-block fixed with respect to a support outside the mechanism;
   a cam mounted to rotate with respect to said cylinder-block about an axis of rotation;
   an internal fluid distributor slide valve, fast with respect to the rotation of said cam, presenting a central recess whose shape is complementary of that of a central core fast with respect to the rotation of said cylinder-block;
   grooves made between said internal fluid distributor slide valve and central core, constituting enclosures capable of containing fluids under pressure; and
   seal elements disposed between the internal fluid distributor valve and the central core, on either side of each groove, each contained in a housing made in a first of the two pieces—internal distributor valve and central core;
   each seal element comprises a ring-type joint which is made of a plastics material and is in tight contact with the second of said two pieces; the maximum value of the pressures in said grooves being equal to 450 bars and that of the speed of rotation of the cam with respect to the cylinder-block, therefore of the internal fluid distributor valve with respect to the central core, being equal to 220 rpm; and
   a spring interposed between the bottom of the housing for a ring-type joint and said ring-type joint and said spring having an effect of tending to deform the joint in the sense of its application on the opposite face of the second of said two pieces.

2. The mechanism of claim 1, wherein the spring is constituted by an O-ring made of elastomer.

3. The mechanism of claim 2, wherein the spring is constituted by a metal ring, cut and elastically deformable.

4. The mechanism of claim 1, wherein the housings for the seal elements are made in the central core.

5. The mechanism of claim 2, wherein the housings for the seal elements are made in the central core.

6. The mechanism of claim 3, wherein the housings for the seal elements are made in the central core.

* * * * *